(12) United States Patent
Kim et al.

(10) Patent No.: US 6,174,945 B1
(45) Date of Patent: Jan. 16, 2001

(54) HALOGEN-FREE FLAMEPROOF THERMOPLASTIC MOLDING MATERIALS

(75) Inventors: Yong-Se Kim, Daejeon; Duk-Gun Hwang; Hong-Jang Kim, both of Seoul; Kwang-Jae Lee; Jong-Gu Kum, both of Daejeon, all of (KR)

(73) Assignee: LG Chemical Ltd., Seoul (KR)

( * ) Notice: Under 35 U.S.C. 154(b), the term of this patent shall be extended for 0 days.

(21) Appl. No.: 09/336,201

(22) Filed: Jun. 18, 1999

(30) Foreign Application Priority Data

Jun. 14, 1999 (KR) .................................... 99-22065

(51) Int. Cl.⁷ ................................. C08K 5/52; C08K 5/54
(52) U.S. Cl. .......................... 524/127; 524/141; 524/267
(58) Field of Search ............................. 525/464; 524/127, 524/267, 141; 528/43

(56) References Cited

U.S. PATENT DOCUMENTS

| | | | |
|---|---|---|---|
| 4,305,856 | * 12/1981 | Sakano et al. | 524/267 |
| 4,375,525 | * 3/1983 | Idel et al. | 524/264 |
| 4,417,018 | * 11/1983 | Ogawa et al. | 524/261 |
| 4,663,374 | * 5/1987 | Sonoda | 524/267 |
| 4,692,488 | 9/1987 | Kress et al. | |
| 4,914,144 | 4/1990 | Muehlbach et al. | |
| 5,061,745 | 10/1991 | Wittmann et al. | |
| 5,153,251 | * 10/1992 | Lupinski et al. | 524/267 |
| 5,204,394 | 4/1993 | Gosens et al. | |
| 5,294,655 | * 3/1994 | Lee et al. | 524/267 |
| 5,357,003 | * 10/1994 | Smith et al. | 524/267 |

* cited by examiner

*Primary Examiner*—Veronica P. Hoke
(74) *Attorney, Agent, or Firm*—Alston & Bird LLP

(57) ABSTRACT

The present invention relates to halogen-free flameproof thermopolastic molding compounds which comprise an aromatic polycarbonate, a styrene-containing copolymer, a styrene-containing graft polymer, a phosphorus compound, a silicon compound, and a tetrafluoroethylene polymer. It has been found that the use of a specific type of silicon compound leads to a polymer mixture having improved stress crack resistance and impact properties.

The silicon compound is represented as the following Formula (I).

Formula (I):

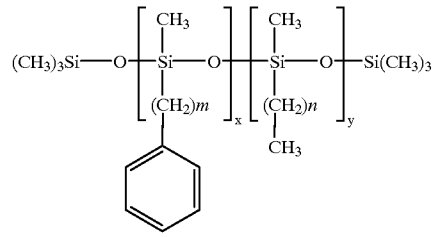

in which n and m have a value of from 5 to 8, and x and y have a value of from 1 to 5.

8 Claims, No Drawings

HALOGEN-FREE FLAMEPROOF THERMOPLASTIC MOLDING MATERIALS

BACKGROUND OF THE INVENTION (a) Field of the Invention

The present invention relates to halogen-free flameproof thermoplastic molding compounds which comprise an aromatic polycarbonate, a styrene-containing copolymer, a styrene-containing graft polymer, a phosphorus compound, a silicon compound, and a tetrafluoroethylene polymer.

(b) Description of the Related Art

Flameproof polycarbonate/styrenic resin molding materials are widely used for electrical appliances. Most known flameproof blends of polycarbonate and styrenic resin contain halogenated flame retardant, which results in the release of toxic gas in the event of fire. To overcome such safety problems, halogen-free flameproof polycarbonate/styrenic resin molding materials have been developed by using phosphorus compounds.

U.S. Pat. No. 4,692,488 discloses thermoplastic molding materials containing a halogen-free aromatic polycarbonate, a styrene-containing copolymer, a phosphorus compound, and tetrafluoroethylene polymer as a coagulated mixture of styrene-containing graft polymers. The molding materials described in the U.S. Pat. No. 4,692,488 have satisfactory flame retardancy, but have completely inadequate impact strengths.

To increase the impact strength of the polycarbonate molding compositions which contain phosphorus compounds as a flame retardant, styrene-containing graft polymers have been used in prior art.

For example, U.S. Pat. No. 5,061,745 discloses polymer blends prepared from an aromatic polycarbonate, acrylonitrile-butadiene-styrene (ABS) graft polymer and/or styrene-containing copolymer, a monophosphorus compound, and a tetrafluoroethylene polymer. The patent shows that the use of ABS graft polymer increases impact strength.

U.S. Pat. No. 4,914,144 discloses polymer mixtures which consist of an aromatic polycarbonate, styrene-containing graft polymer based on an acrylate rubber, a styrene-containing copolymer, a monophosphorus compound, and a tetrafluoroethylene polymer.

U.S. Pat. No. 5,204,394 discloses polymer mixtures comprising an aromatic polycarbonate, a styrene-containing copolymer and/or styrene-containing graft polymer, and an oligomeric phosphate or a blend of oligomeric phosphates as flame retardant.

Although the above listed prior technologies have an adequate flame retardancy and mechanical properties, they have problems in achieving sufficient stress crack resistance.

When molding materials have poor stress crack resistance, problems such as cracks in molded parts may occur. Good stress crack resistance of the molding material is particularly important when the molding materials are injection molded into thin-walled parts or subjected to contact with chemicals.

SUMMARY OF THE INVENTION

It is an object of the present invention to provide a flameproof thermoplastic molding materials having stress crack resistance and impact resistance comprising an aromatic polycarbonate, styrene-containing copolymer, styrene-containing graft polymer, a monophorus compound and/or an oligomeric phosphorus compound, a silicon compound, and tetrafluoroethylene polymer.

It is another object of the present invention to provide a flameproof thermoplastic molding material characterized in that the polymer mixture contains conventional additives selected form antioxidants, dyes, pigments, lubricants, light stabilizers, and inorganic fillers.

The present invention is based on the discovery that the incorporation of a specific silicon compound as will be described here below results in an excellent stress crack resistance.

DETAILED DESCRIPTION OF THE PREFERRED EMBODIMENTS

In the following detailed description, only the preferred embodiment of the invention has been shown and described simply by way of illustration of the best mode contemplated by the inventor(s) of carrying out the invention. As will be realized, the invention is capable of modification in various obvious respects, all without departing form the invention. Accordingly, the descriptions are to be regarded as illustrative in nature, and not restrictive.

The present invention relates to flameproof thermoplastic molding materials comprising:

i) 40 to 90 parts by weight of an aromatic polycarbonate (Component A), ii) 5 to 30 parts by weight of styrene-containing copolymer (Component B), iii) 5 to 30 parts by weight of styrene-containing graft polymer (Component C), iv) 1 to 25 parts by weight, based on 100 parts by weight of the above i) plus the above ii) plus the above iii), of a monophorus compound (Component D.1) and/or an oligomeric phosphorus compound (Component D.2), v) 0.5 to 15 parts by weight, based on 100 parts by weight of the above i) plus the above ii) plus the above iii), of silicon compound (Component E) corresponding to Formula (I), Formula (I):

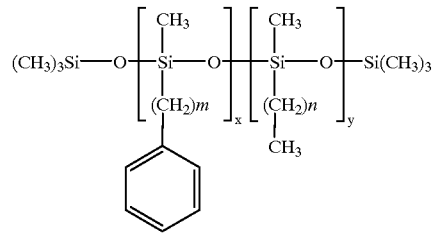

in which n and m range form 5 to 8, and the value of x and y range from 1 to 5, and vi) 0.05 to 5 parts by weight, based on 100 parts by weight of the above i) plus the above ii) plus the above iii) of a tetrafluoroethylene polymer (Component F).

The polymer mixture according to the invention may contain inorganic fillers having flame-retarding synergistic effects. It has been found that the use of talc improves the flame-retarding properties, although it detracts form impact strength. As a result, the use of inorganic fillers appears to be inadequate in some applications which require high impact strength. It has now been found the addition of a specific silicon compound not only enhance stress crack resistance but also increases impact strength of the molding materials, particularly in case of organic filler incorporated compositions.

COMPONENT A

Thermoplastic halogen-free aromatic polycarbonates (Component A) of the present invention are derived form diphenols of the following Formula (II);

Formula (II):

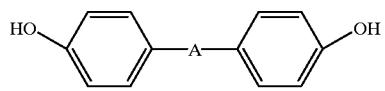

in which A is a single bond, $C_1$–$C_3$ alkylene, $C_2$–$C_3$ alkylidene, $C_3$–$C_6$ cycloalkylidene, —S—, or —$SO_2$—.

The diphenols are either known form literature or maybe produced by methods known from literature. Suitable diphenols, are, for example, hydroquinone, resorcinol, 4,4'-dihydroxydiphenyl, 2,2-bis-(4-hydroxyphenyl)-propane, or 1,1-bis-(4-hydroxyphenyl)-cyclohexane.

The production of the polycarbonates suitable for the present invention is known from literature and may be carried out, for example, with phosgene by the interfacial process or with phosgene by the homogeneous-phase process. The polycarbonates suitable for the present invention have average molecular weights (Mw) from 10,000 to 200,000, preferably from 20,000 to 80,000.

The polycarbonates A which are suitable according to this invention may be branched in a conventional manner, preferably by the incorporation of from 0.05 to 2.0 mol % (based on the sum of the diphenols used) of trifunctional or polyfunctional compounds.

COMPONENT B

A flameproof thermoplastic molding material of the present invention is characterized in that its styrene-containing copolymer (Component B) are those prepared from at least one monomer of a B1) group comprising styrene, α-methylstyrene, ring-substituted styrenes, $C_1$–$C_8$ alkyl methacrylate, and $C_1$–$C_8$ alkyl acrylate and at least one monomer of a B2) group comprising acryloritnle, methacrylonitrile, maleic anhydride, maleimide, and N-substituted maleimids.

Component B copolymers are known and can be prepared by free radical polymerization, in particular by emulsion, suspension, solution, or mass polymerization.

The styrene-containing copolymers contain 50 to 98, preferably 60 to 95 parts by weight of B1) group monomer and 50 to 2, preferably 40 to 5 parts by weight of B2) group monomer.

These copolymers are thermoplastic and contain no rubber. Particularly preferred copolymers are those prepared from styrene with acrylonitrile and optionally methyl methacrylate.

These copolymers have average molecular weights of between 15,000 and 200,000, preferably between 60,000 to 200,000.

COMPONENT C

Styrene-containing graft polymers (Component C) of the present invention can be obtained by grafting a mixture of at least two monomers on a rubber. Suitable monomers are selected form at least one monomer of a group C1) comprising styrene, α-methylstyrene, ring-substituted styrenes, $C_1$–$C_8$ alkyl methacrylate, $C_1$–$C_8$ alkyl acrylate and at least one monomer of a group C2) comprising acrylonitrile, methacrylonitrile, maleic anhydride, and a derivative of maleic anhydride. Suitable derivatives of maleic anhydride are maleimide and an N-substituted maleimide such as N-phenyl maleimide.

Particularly preferred monomer mixtures are styrene and acrylonitrile, α-methylstyrene and acrylonitrile, styrene and methyl methacrylate and styrene and maleic anhydride.

Rubbers are present in these graft polymers in the form of partially crosslinked particles having an average particle size of from 0.1 to 7 μm.

Examples of suitable rubbers are polybutadiene, butadiene-styrene copolymers, and acrylate rubbers. Other suitable rubbers are, for example, ethylene-propylene diene monomer (EPDM) and silicone rubbers. Preferred rubbers for the production of these graft polymers are diene and alkyl acrylate rubbers. The graft polymers are produced by radical graft polymerization of the monomer mixture as described above in the presence of the rubbers. Preferred production processes for these graft polymer are emulsion, solution, or suspension polymerization.

COMPONENT D

The polymer compositions according to the invention contain a monophosphorus compound D1) and/or an oligomeric phosphorus compound D2). Component D1) is a phosphorus compound of the below Formula (III), Formula (III):

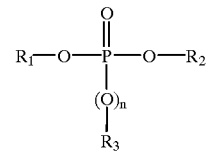

in which $R_1$, $R_2$, and $R_3$ are each a randomly selected $C_1$–$C_8$ alkyl, $C_5$–$C_{20}$ aryl, or $C_7$–$C_{12}$ arylalkyl, and n is 0 or 1.

Phosphorus compounds of component D1), which are suitable according to the invention, comprise for example, triphenyl phosphate, tricresyl phosphate, diphenyl 2-ethylcresyl phosphate, tri-(iso-propylphenyl) phosphate, diphenyl methyl phosphonate, and diethyl phenyl phosphonate.

Component D2) is an oligomeric phosphorus compound of the below Formula (IV),

Formula (IV):

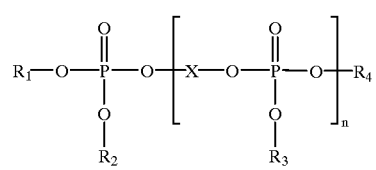

in which $R_1$, $R_2$, $R_3$, and $R_4$ are each a randomly selected $C_1$–$C_8$ alkyl, $C_5$–$C_6$ cycloalkyl, $C_8$–$C_{10}$ aryl, or $C_7$–$C_{12}$ arylalkyl, and x represents a residue derived from resorcinol or hydroquinone.

The n values of an oligomeric phosphorus compound range from 0 to 5, preferably between 1 and 2. Mixtures of various oligomeric phosphates may also be used according to this invention.

COMPONENT E

The silicone compound (Component E) of the present invention is an aralkyl modified methylalkylpolysiloxane represented as in the following Formula (I), Formula (I):

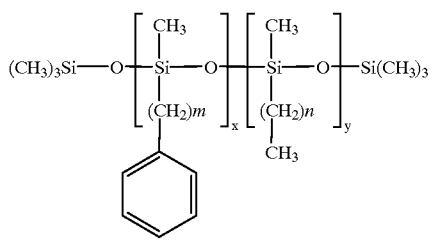

in which n and m have a value of from 5 to 8, and x and y have a value of from 1 to 5.

The above aralkyl modified methylalkylpolysiloxane is well known;

COMPONENT F

The tetrafluoroethylene polymers (Component F), which are suitable according to this invention, are polymers with fluorine content of 65 to 76% by weight. The particle size of the tetrafluoroethylene polymers according to the invention is in the range of 0.05 to 20 $\mu$m, and the density is in the range of 1.2 to 1.9 g/cm$^2$. By adding the tetrafluoroethylene polymers, the dripping of melted molding composition during burning is reduced or prevented completely.

COMPONENT G

In addition to the above components, the polymer mixture according to the invention may comprise further inorganic compounds (Component G) active as a synergist, for example, talc. Though talc is generally used as inorganic fillers, and thus fall into the category of fillers, it has been found according to this invention that the addition of a small amount of talc improves flame-retarding properties.

The thermoplastic molding composition according to the present invention can contain other known polycarbonates or thermoplastic polymers additives. Examples of such additives include antioxidants, dyes, pigments, lubricants, light stabilizers, and inorganic fillers. Examples of inorganic fillers are glass fiber, carbon fiber, mica, whiskers, and wollastonite, etc.

EXAMPLES

The products described below were used for the preparation of the molding materials:

A) a commercial polycarbonate based on bisphenol A, which has a relative solution viscosity of 1.28 ml/g, was used as Component A.

B) styrene/acrylonitrile copolymer with a styrene/acrylonitrile ratio of 72:28 and a average molecular weight of about 140,000 was used as Component B;

C) graft polymer composed of styrene in which the ratio of styrene and acrylonitrile was 72:28 and the ratio of acrylonitrile mixture and polybutadiene rubber content was 55:45;

D1) triphenylphosphate;

D2) poly(phenyl-1,3-phenylenephospate) with an average value of n of about 1.4;

E) aralkyl modified methyl-alkylpolysiloxane (BYK-322 of BYK chemie was used);

F) a tetrafluoropolyethylene; and

G) talc.

The thermoplastic molding composition according to the present invention, containing of components A to F and, if appropriate, other known additives (such as stabilizer, pigments, fillers, antistatic agents) were prepared by melt extrusion at temperatures of 200° C. to 300° C. Test specimens were produced with an injection molding machine at 240° C.

The impact strength was measured according to the ASTM D256 on V-shaped notched bars. Stress crack resistance was measured on specimens with the dimensions of 127×12.7×3 mm. The tests specimens were fixed on a jig having 2.5% strain, and then dipped in a mixture of 40 vol. % Isopropanol and 60 vol. % toluene for 10 minutes. Stress crack resistance was determined by assessing whether any cracks or failures occurred on the sample surface. Flame retardation property was measured in accordance with the Underwriters' Laboratory (UL) standard on bars with dimensions of 127×12.7×1.6 mm. The composition and properties of the blends are summarized in Table 1.

TABLE 1

| Classification | EXAMPLE 1 | EXAMPLE 2 | EXAMPLE 3 | COM. EXAMPLE 1 | COM. EXAMPLE 2 | COM. EXAMPLE 3 | COM. EXAMPLE 4 |
|---|---|---|---|---|---|---|---|
| Composition | | | | | | | |
| A | 75 | 75 | 75 | 75 | 75 | 75 | 75 |
| B | 10 | 10 | 10 | 10 | 10 | 10 | 10 |
| C | 15 | 15 | 15 | 15 | 15 | 15 | 15 |
| D.1 | 10 | 10 | — | 10 | — | 10 | — |
| D.2 | — | — | 12 | — | 10 | — | 12 |
| E | 1.0 | 2.0 | 1.0 | — | — | — | — |
| F | 0.5 | 0.5 | 0.5 | 0.5 | 0.5 | 0.5 | 0.5 |
| G | — | 3 | — | — | — | 3 | — |
| Characteristics | | | | | | | |
| Impact strength (kgf · cm/cm) | 60 | 45 | 58 | 50 | 47 | 22 | 25 |
| UL-rating | V-1 | V-0 | V-0 | V-1 | V-1 | V-0 | V-0 |
| Stress crack resistance* | ◯ | ◯ | ◯ | X | X | X | X |

*Stress crack resistance
X: crack on the specimen surface was observed.
◯: no crack on the specimen surface was observed.

From the test results of Table 1, it can be seen that Comparative Examples 1 to 4, which do not contain silicon compound, show poor stress crack resistance, as cracks appeared on the specimens' surfaces.

However, Examples 1 to 3 according to the present invention exhibit considerable improvement in stress crack resistance as evidenced by the lack of crack formation on the specimens' surfaces. Comparative Example 3 shows better flame retardancy and was assigned a V-0 as compared to Comparative Example 1 which received a rating of V-1, indicating that the use of talc increases the flame retardation properties.

Comparative Example 3, however, shows a lack in impact properties. When the silicon compound according to the invention is added as shown in Example 2, a distinct increase in the impact strength as well as the stress crack resistance was observed.

Although preferred embodiments of the present invention have been described in detail hereinabove, it should be clearly understood that many variations and/or modifications of the basic inventive concepts herein taught which may appear to those skilled on the present art will still fall within the spirit and scope of the present invention, as defined in the appended claims.

What is claimed is:

1. A flameproof thermoplastic molding material comprising:
   i) 40 to 90 parts by weight of an aromatic polycarbonate,
   ii) 5 to 30 parts by weight of styrene-containing copolymer,
   iii) 5 to 30 parts by weight of styrene-containing graft polymer,
   iv) 1 to 25 parts by weight, based on 100 parts by weight of the above i) plus the above ii) plus the above iii), of a monophorus compound and/or an oligomeric phosphorus compound,
   v) 0.5 to 15 parts by weight, based on 100 parts by weight of the above i) plus the above ii) plus the above iii), of silicon compound corresponding to Formula (I), Formula (I):

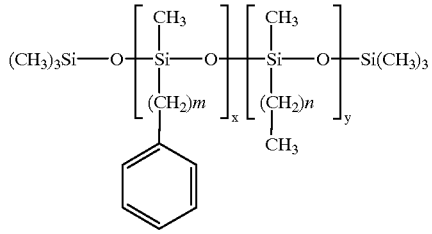

in which n and m have a value of from 5 to 8, and x and y have a value of from 1 to 5, and
   vi) 0.05 to 5 parts by weight, based on 100 parts by weight of the above i) plus the above ii) plus the above iii), of tetrafluoroethylene polymer with fluorine contents of 65 to 78% by weight.

2. A flameproof thermoplastic molding material in accordance with claim 1 characterized in that the styrene-containing copolymers are those prepared from at least one monomer of a B.1) group comprising styrene, α-methylstyrene, ring-substituted styrenes, $C_1$–$C_8$ alkyl methacrylate, and $C_1$–$C_8$ alkyl acrylate, and at least one monomer of a B.2) group comprising acrylonitrile, methacrylonitrile, maleic anhydride, maleimide, and N-phenyl maleimide.

3. A flameproof thermoplastic molding material in accordance with claim 1 characterized in that the graft polymer is a copolymer in which a mixture comprising styrene, α-methylstyrene, or alkylstyrene, and acrylonitrile, methacrylonitrile, maleic acid anhydride, or a maleic acid anhydride derivative (with the sum of the amount of styrene, α-methylstyrene, or alkylstyrene used and the amount of acrylonitrile, methacrylonitrile, maleic acid anhydride, or maleic acid anhydride derivative used being 100 wt parts) is grafted into a polybutadiene, butadiene-styrene copolymer, or acrylate rubber phase.

4. A flameproof thermoplastic molding material in accordance with claim 1 characterized in that the monophorus compound has the following Formula (III), Formula (III):

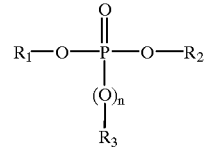

in which $R_1$, $R_2$, and $R_3$ are each a randomly selected $C_1$–$C_8$ alkyl group, $C_5$–$C_{20}$ aryl group, or $C_7$–$C_{12}$ arylalkyl group, and n is 0 or 1.

5. A flameproof thermoplastic molding material in accordance with claim 1 characterized in that the oligomeric phosphorus compound has the following Formula (IV), Formula (IV):

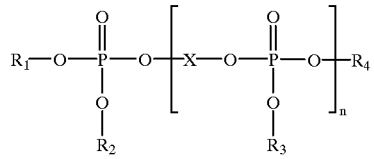

where $R_1$, $R_2$, $R_3$, and $R_4$ are each a randomly selected $C_1$–$C_8$ alkyl group, $C_5$–$C_6$ cycloalkyl group, $C_6$–$C_{10}$ aryl group, or $C_7$–$C_{12}$ arylalkyl group, X is a $C_6$–$C_{30}$ monocycloaromatic group or polycyclicaromatic group, and n a whole number from 0 to 5.

6. A flameproof thermoplastic molding material in accordance with claim 1 characterized in that the polymer mixture also comprises 1 to 10 parts by weight, based on 100 parts by weight of the above i) plus the above ii) plus iii), of talc as a flame-retarding synergist.

7. A flameproof thermoplastic molding material in accordance with claim 1 characterized in that the polymer mixture contains conventional additives selected from antioxidants, dyes, pigments, lubricants, light stabilizers, and inorganic fillers.

8. Articles produced from the polymer mixture in accordance with claim 1.

* * * * *